United States Patent [19]

Mori et al.

[11] 4,217,172

[45] Aug. 12, 1980

[54] COOLANT SYSTEM AND COOLING METHOD UTILIZING TWO-PHASE FLOW FOR NUCLEAR FUSION REACTOR

[75] Inventors: Yasuo Mori; Kunio Hijikata, both of Tokyo, Japan

[73] Assignee: Tokyo Institute of Technology, Tokyo, Japan

[21] Appl. No.: 841,981

[22] Filed: Oct. 13, 1977

Related U.S. Application Data

[63] Continuation of Ser. No. 637,845, Dec. 5, 1975, abandoned.

[51] Int. Cl.² .................................................. G21B 1/00
[52] U.S. Cl. ............................................ 176/9; 176/50
[58] Field of Search ........................ 176/42, 52, 45–49, 176/39, 50, 1, 9

[56] References Cited

U.S. PATENT DOCUMENTS

| | | | |
|---|---|---|---|
| 3,113,082 | 12/1963 | Imhoff et al. | 176/1 |
| 3,386,886 | 6/1968 | Whittier | 176/42 |
| 3,494,829 | 2/1970 | Mialki et al. | 176/46 |
| 3,624,239 | 11/1971 | Fraas | 176/1 |

OTHER PUBLICATIONS

"Proceedings of the Fifth Symposium on Eng. Problems of Fusion Research," 11/73, pp. 79, 105, 106, 163–169, 173–175, 235, 236, 252–254.
NSENAO-58, No. 2, 10/75, pp. 107–120, 138.

*Primary Examiner*—Harvey E. Behrend
*Attorney, Agent, or Firm*—Burgess, Ryan and Wayne

[57] ABSTRACT

A coolant system and cooling method for a neutron generating reactor, wherein the gas helium is blown in the form of bubbles into the liquid coolant such as liquid metallic lithium in the liquid coolant blanket, thereby removing heat from the liquid coolant.

2 Claims, 1 Drawing Figure

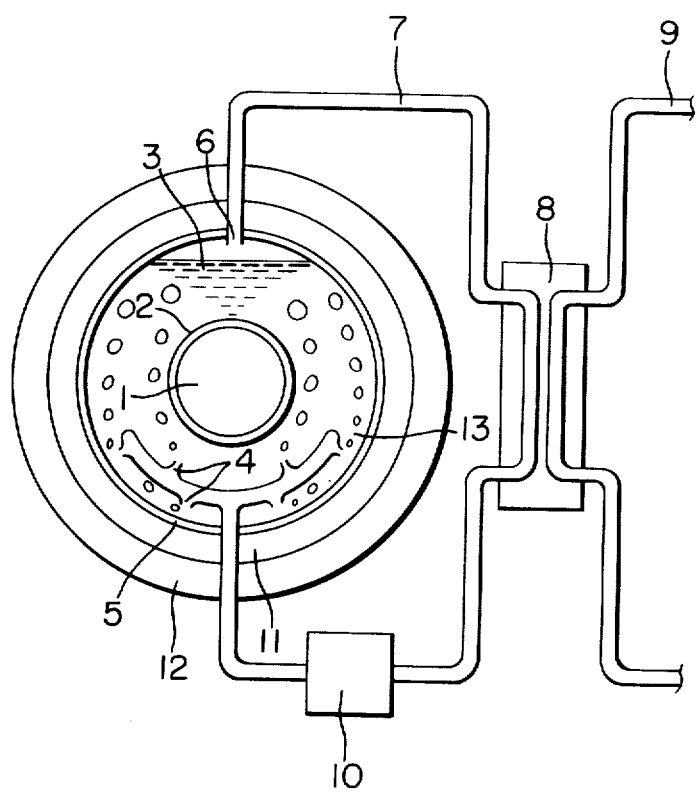

COOLANT SYSTEM AND COOLING METHOD UTILIZING TWO-PHASE FLOW FOR NUCLEAR FUSION REACTOR

This is a continuation, of application Ser. No. 637,845, filed Dec. 5, 1975 now abandoned.

BACKGROUND OF THE INVENTION

The present invention relates to a coolant system and cooling method for a neutron generating reactor, wherein the gas helium coolant is blown in the form of bubbles into the liquid coolant, such as liquid metallic lithium, to remove heat therefrom.

In the neutron generating reactor, neutrons produced by the means known in the art are absorbed by a coolant and are converted into thermal energy. It has been proposed to use liquid metallic lithium as the liquid coolant because tritium breeding is possible. When liquid metallic lithium flows through a blanket, it passes the strong magnetic field so that it is subjected to the very strong electromagneto-hydraulic resistance. As a result, a considerably high power is required to circulate liquid metallic lithium. To overcome this drawback, there has been proposed to use the gas coolant consisting of helium, but tritium breeding is impossible by this method.

SUMMARY OF THE INVENTION

One of the objects of the present invention is to provide a coolant system and cooling method for removing heat from a neutron generating reactor without circulating the liquid coolant, such as liquid metallic lithium, across the magnetic field.

Another object of the present invention is to provide a coolant system and cooling method for a neutron generating reactor capable of removing heat therefrom without circulating liquid metallic lithium across the strong magnetic field, breeding tritium and permitting the easy removal of tritium produced and helium, which is a gas coolant.

A further object of the present invention is to provide a coolant system and cooling method for a neutron generating reactor, wherein the gas coolant consisting of helium is blown in the form of bubbles into the liquid coolant consisting of liquid metallic lithium in the liquid coolant blanket, thereby directly removing heat from the liquid coolant.

BRIEF DESCRIPTION OF THE DRAWING

The single FIGURE is a schematic sectional view of a neutron generating reactor illustrating a coolant system and method in accordance with the present invention.

DESCRIPTION OF THE PREFERRED EMBODIMENT

Referring to the single FIGURE, neutrons produced by the fusion reaction carried out in the plasma 1 at extremely high temperatures of the order of $10^8°$ C. pass through a vacuum wall 2 and are absorbed by the coolant 3 consisting of liquid metallic lithium to be converted into thermal energy with the resultant product of tritium. The gas coolant consisting of helium gas is blown through blow holes 4 into the liquid coolant 3 toward the vacuum wall 2 and the inner wall surface of a coolant blanket 5 in order to prevent the excessive temperature rise of the vacuum wall and coolant blanket and consequently thermal breakdown thereof. The high temperature helium coolant, which has removed heat from the liquid coolant 3, is discharged through an outlet 6 and flows through a helium coolant loop 7 into a heat-exchanger 8, where the heat of the helium coolant is transferred to a secondary loop 9. Thereafter, the helium coolant is pressurized by a compressor 10 and charged again into the liquid coolant blanket 5. The tritium which is produced is removed by suitable means (not shown) inserted into the helium coolant circuit. Reference numeral 11 denotes a heat and radiation shield; 12, a magnet; and 13, bubbles of helium.

What is claimed is:

1. A heat generation and transfer system, comprising:
   a container of generally cylindrical cross-section surrounded by a vacuum wall;
   a source of energetic neutrons within said container, said neutrons penetrating said vacuum wall;
   a coolant blanket surrounding said container, the space between said wall and blanket being substantially filled with a relatively stationary mass of liquid metallic lithium heated by absorption of said neutrons;
   means outside said blanket for generating a strong magnetic field within said blanket, said field impeding flow of said liquid lithium;
   means including an inlet conduit for introducing bubbles of gaseous helium into said lithium mass and for directing said bubbles for relative movement through said mass toward said vacuum wall and said coolant blanket;
   means including an outlet conduit for removing heated gaseous helium from said space between said vacuum wall and said coolant blanket; and
   means for extracting heat from said heated gaseous helium.

2. A process for removing heat from a hot substantially stationary mass of liquid lithium surrounding a container and disposed within a strong magnetic field which impedes flow thereof, said mass of liquid lithium being surrounded by outer walls, said container having a source of energetic neutrons therein, said neutrons penetrating the container walls and supplying heat by absorption to said mass of liquid lithium said process comprising the steps of:
   blowing bubbles of gaseous helium into said lithium mass and directing said bubbles toward said outer walls and said container walls
   removing the heated gaseous helium from said lithium mass; and
   extracting heat from said removed heated gaseous helium.

* * * * *